United States Patent
Xhafa et al.

(10) Patent No.: US 8,456,998 B2
(45) Date of Patent: Jun. 4, 2013

(54) REDUCING CHANNEL OVERHEAD IN A WIRELESS COEXISTENCE NETWORK

(75) Inventors: Ariton E. Xhafa, Plano, TX (US); Yanjun Sun, Richardson, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 581 days.

(21) Appl. No.: 12/727,805

(22) Filed: Mar. 19, 2010

(65) Prior Publication Data

US 2010/0238807 A1  Sep. 23, 2010

Related U.S. Application Data

(60) Provisional application No. 61/161,447, filed on Mar. 19, 2009.

(51) Int. Cl.
*H04L 12/26* (2006.01)
*H04W 4/00* (2009.01)

(52) U.S. Cl.
USPC .......................................... 370/241; 370/328

(58) Field of Classification Search
USPC ...................... 370/328, 338, 450, 241
See application file for complete search history.

(56) References Cited

U.S. PATENT DOCUMENTS

| | | | |
|---|---|---|---|
| 2007/0161349 A1 | 7/2007 | Grushkevich | |
| 2008/0253347 A1 | 10/2008 | Cordeiro et al. | |
| 2008/0279162 A1* | 11/2008 | Desai | 370/338 |
| 2009/0196210 A1* | 8/2009 | Desai | 370/311 |
| 2009/0310692 A1* | 12/2009 | Kafle et al. | 375/260 |
| 2010/0008338 A1* | 1/2010 | Tsfati et al. | 370/338 |
| 2010/0029325 A1* | 2/2010 | Wang et al. | 455/553.1 |
| 2011/0019555 A1* | 1/2011 | Gotoh et al. | 370/252 |

* cited by examiner

*Primary Examiner* — Brian D Nguyen
(74) *Attorney, Agent, or Firm* — Steven A. Shaw; W. James Brady; Frederick J. Telecky, Jr.

(57) ABSTRACT

A system composed of a device configured to communicate, using a first wireless protocol, with a node. The system also comprises a processor coupled to the device and configured to determine whether the node operates in a coexistence mode. If the processor determines that the node operates in a coexistence mode then, as a result, the processor determines when the node operates in the first wireless protocol and communicates, by way of the device and without solicitation from the node, with the node when the node operates in the first wireless protocol.

11 Claims, 4 Drawing Sheets

REDUCING CHANNEL OVERHEAD IN A WIRELESS COEXISTENCE NETWORK

CROSS-REFERENCE TO RELATED APPLICATION

The present application claims priority to U.S. Provisional Patent Application No. 61/161,447, filed on Mar. 19, 2009, which is hereby incorporated herein by reference.

BACKGROUND

Mobile devices are able to access multiple networks using wireless protocols operating at close frequency bands. However, when a single device utilizes two or more wireless protocols, the proximity of the frequency bands may lead to interference between data sent using the protocols, which may cause problems with the simultaneous operation of the protocols. Specifically, out-of-band transmissions using one protocol may saturate a receiver using a second protocol, effectively blocking transmissions using the second protocol. Thus, coexistence of multiple protocols on a single device often is problematic.

SUMMARY

The problems noted above are solved in large part by a system comprising a device configured to communicate, using a first wireless protocol, with a node. The system also comprises a processor coupled to the device and configured to determine whether the node operates in a coexistence mode. If the processor determines that the node operates in a coexistence mode then, as a result, the processor determines when the node operates in the first wireless protocol. The processor communicates, by way of the device and without solicitation from the node, with the node when the node operates in the first wireless protocol.

Furthermore, the problems noted above are solved in large part by a system comprising a device configured to communicate with an access point using a first wireless protocol. The system also comprises a processor coupled to the device and configured to operate the device in a coexistence mode. If the processor receives an acknowledgement from the access point that the processor operates in the coexistence mode, the processor receives data from the access point, by way of the device and without solicitation from the processor.

Still further, the problems noted above are solved in large part by a method comprising determining, by an access point, that a node is operating in a coexistence mode. The method also comprises determining, by the access point, when the node is operating in either of a first wireless protocol or a second wireless protocol. The method further comprises communicating, by the access point and without solicitation from the node, with the node only when the node is operating in the first wireless protocol.

Finally, the problems noted above are solved in large part by a method comprising sending, by a node, an indication that the node is operating in a coexistence mode. The method also comprises receiving, by the node, an acknowledgement from an access point that the node is operating in a coexistence mode. The method further comprises communicating, by the node and without solicitation from the node, with the access point.

BRIEF DESCRIPTION OF THE DRAWINGS

For a detailed description of exemplary embodiments of the invention, reference will now be made to the accompanying drawings in which.

NOTATION AND NOMENCLATURE

Figure 1:
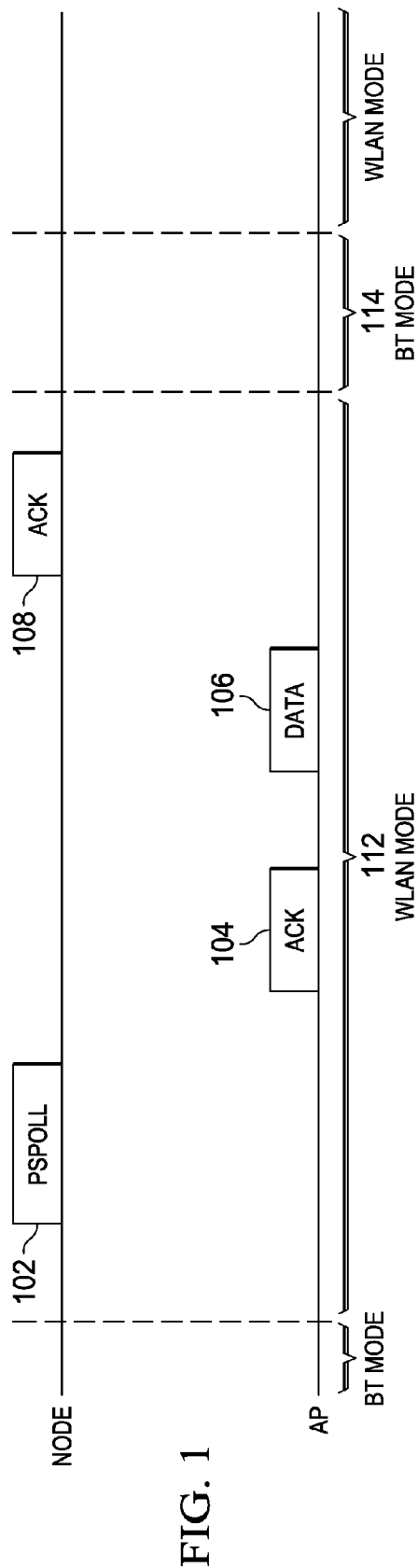
FIG. 1 shows the transmission of a Power Save Poll (PSPoll) frame for communication between a node and an access point in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless connection. The term "WLAN" refers to a wireless local area network, for example, in the IEEE 802.11 protocol. The term BT refers to the Bluetooth® wireless protocol. The term "U-APSD" refers to an unscheduled automatic power-saving delivery mode, where certain circuits are turned off when not needed for various computing functions. The term "PSPoll" refers to a power save poll frame, which may be used to alert a node of a network that the node sending the frame is available for data transmission. The term "AP" refers to an access point, which may be a device that facilitates wireless communication in a wireless network. The term "CTS2Self" refers to a frame, which may reserve a period of network silence. The terms "RTS" and "CTS" refer to Request to Send and Clear to Send messages, respectively. The term "ACK" refers to an acknowledgement message.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Time multiplexed switching between protocols is utilized to facilitate coexistence of multiple wireless technologies at a single node (e.g., a computer, PDA, smart phone). For example, in the case of WLAN and Bluetooth® (BT) coexistence, BT voice calls take priority over other data traffic flows using WLAN. During the time periods in which the node operates in BT mode, the WLAN portion operates in an unscheduled automatic power-saving delivery (U-APSD) mode. In the U-APSD mode, circuitry that is required only for WLAN mode operation may be turned off, so that power may be conserved when the WLAN mode is not active (i.e., during BT operation). During the time in which the node operates in WLAN mode, the node may indicate that it is ready to receive a data frame by sending a trigger frame to an access point (AP). The trigger frame may be, for example, a Power Save Poll (PSPoll) frame in the IEEE 802.11 standard (all 802.11 protocols are hereby incorporated herein by reference).

If the AP sends a data frame addressed to the node within the WLAN mode time period and expects a subsequent acknowledgment signal but the node is not able to reply with such an acknowledgement signal, a rate-fall back mechanism is triggered by the AP. Alternatively, if the AP sends a data frame outside of the WLAN mode time period, the rate-fall back mechanism is triggered. In either situation, this rate-fall back mechanism reduces the transmission rate used to send data frames from the AP to the node, causing the data frames transmitted to occupy longer time intervals. This, in turn, may lead to conflict with the use of the medium by the BT mode. As a result, the performance of the node in both BT and WLAN modes deteriorates. Such deterioration may be referred to as the "avalanche effect."

Figure 2:
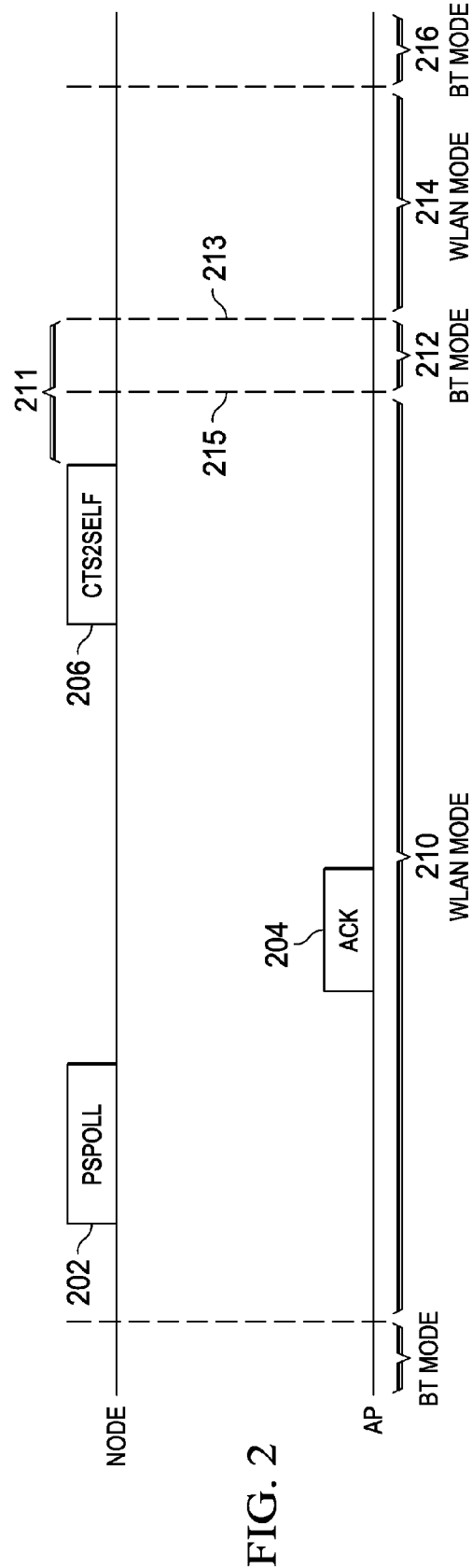
FIG. 2 shows the transmission of a Clear to Send to Self (CTS2Self) frame for communication between a node and an access point in accordance with various embodiments.

FIG. 1 shows the transmission of a PSPoll frame 102 by a node operating in a coexistence mode (i.e., utilizing multiple wireless technologies, in this case BT and WLAN). Additionally, an AP sends an acknowledgement frame 104 and later a data frame 106. Although the node operates in a coexistence mode, the AP only operates using one wireless technology (e.g., WLAN). The node responds with an acknowledgement 108. Typically, the node sends the PSPoll frame 102 to an AP immediately upon switching to WLAN mode 112 to increase the chances that the AP will send a data frame during the WLAN mode time period and not during the following BT mode 114. However, the AP may not be able to send the data frame 106 during the WLAN mode time period 112 if the network is congested. In the case where the node expects a data frame but does not receive one before the end of the WLAN mode time period, the node may send a frame that reserves the network for a period of time, thus avoiding a transfer of data from the AP during the impending BT mode time period 114. In some instances, this frame may take the form of a CTS2Self frame. FIG. 2 shows the transmission of a CTS2Self frame 206 to protect from the avalanche effect. FIG. 2 further shows the transmission of a PSPoll frame 202 and an acknowledgement 204, similar to FIG. 1. To ensure that no transmission to the node takes place during the BT mode time period 212, the time period 211 reserved by the node is the sum of the time remaining in the WLAN mode time period 210 and the time scheduled to be occupied by the impending BT mode time period 212. In this way, the use of the PSPoll 202 and CTS2Self 206 frames provide the node with the ability to solicit communication from the AP during the WLAN mode time period 210 and avoid the avalanche effect.

Although sending the CTS2Self frame prevents the avalanche effect, it also requests a period of network silence, thus silencing other nodes in the network from transmitting or receiving data frames. This may result in a negative impact on the overall network performance.

Various embodiments disclosed herein provide protection from the avalanche effect without the negative network performance impacts associated with the repeated use of CTS2Self frames. Specifically, in some such embodiments, the WLAN and BT modes may be periodic in nature—for example, when BT mode is being used for voice traffic. Such periodicity makes it possible for the AP to predict or estimate when the BT mode will occur in each period (e.g., based on information received from the node in the PSPoll or CTS2Self frames). If the AP successfully predicts, estimates or otherwise determines when the BT mode time period will occur in each period and communicates this information to the node, the node may cease the transmission of the PSPoll frame, CTS2Self frame or both, because the AP no longer requires the information provided in the PSPoll and CTS2Self frames to avoid transmitting to the node during the BT mode time period. The communication from the AP to the node, indicating successful determination of when the BT mode time period will occur, may take the form of an explicit indication or, in alternative embodiments, may be implicitly determined by the node. Thus, communication between the AP and the node may continue without the use of PSPoll and CTS2Self frames (i.e., in an unsolicited manner). The overhead required by the PSPoll and CTS2Self frames may be used for additional data transmissions, thereby positively impacting overall network performance.

Figure 3:
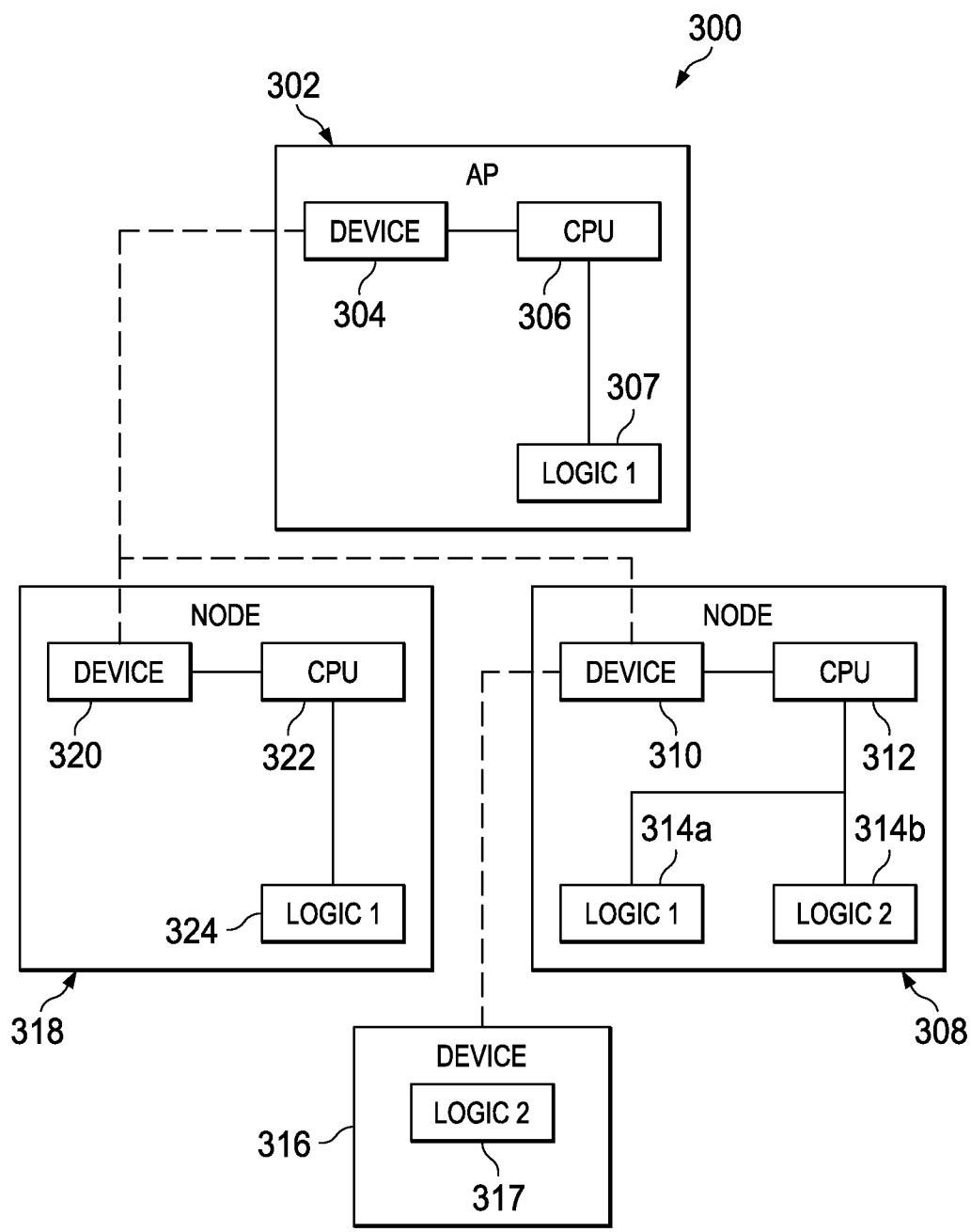
FIG. 3 shows a block diagram of an illustrative system in accordance with various embodiments.

FIG. 3 shows a block diagram of an illustrative system 300 in accordance with various embodiments. System 300 may comprise a wireless network in which at least some nodes are configured to operate in a coexistence mode. That is, at least some nodes are configured to operate using more than one wireless communication protocol (e.g., WLAN, BT). In some embodiments, the coexistence mode is facilitated by time-multiplexing the wireless technologies in a periodic manner.

As shown, system 300 comprises an AP 302 coupled to nodes 308 and 318. The AP 302 comprises a device 304 coupled to a processor 306. The device 304 may be used for wireless communication and may comprise, for example, a wireless transceiver and/or antenna. The node 308 comprises a device 310 coupled to a processor 312. Similar to the device 304, the device 310 may be used for wireless communication. The node 308 also couples to a device 316 by way of device 310. In some embodiments, the device 316 may be a BT-equipped device. The node 318 comprises a device 320 coupled to a processor 322. Similar to devices 304 and 310, the device 320 may be used for wireless communication. The nodes 308 and 318 couple to the AP 302 through device 304, by way of devices 310 and 320, respectively. The system 300 is shown as an exemplary embodiment; one skilled in the art would understand that other embodiments may include more than one AP 302, more than one of each node 308 and 318, or more than one device 316.

In accordance with various embodiments, devices 304, 310, 320 are configured to communicate using one or more wireless communication standards. For example, device 304 and device 320 may be configured to communicate using a first wireless protocol (e.g., WLAN) by utilizing first protocol logics 307 and 324, respectively. The first protocol logics 307 and 324 serve to facilitate, by way of processors 306 and 322, encoding and decoding of signals in the first wireless protocol sent or received by devices 304 and 320. Device 310 may be configured to communicate using both a first wireless protocol (e.g., WLAN) as well as a second wireless protocol (e.g., BT) by utilizing a first protocol logic 314a and a second protocol logic 314b, respectively. The first and second protocol logics 314a, 314b operate similarly to the first protocol logics 307 and 324 above. However, each protocol logic 314a, 314b serves to facilitate, by way of processor 312, encoding and decoding of signals in either the first wireless protocol or the second wireless protocol sent or received by device 310. Device 316 may be configured to communicate using only a second wireless protocol (e.g., BT) by similarly utilizing a second protocol logic 317. Thus, device 310 may enable node 308 to communicate with AP 302 through device 304 using WLAN protocol while also enabling node 308 to communicate with device 316 using BT protocol.

In accordance with various embodiments, node 308 may be configured to operate in a coexistence mode, where both wireless protocol logics 314a, 314b are utilized in a periodic manner. As discussed above, such a coexistence mode may be accomplished by time-multiplexing the wireless protocols. For example, node 308 may utilize the first protocol logic 314a in a first sub-period (e.g., "WLAN mode") and the second logic 314b in a second sub-period (e.g., "BT mode"). As a result, during each period of a periodic communication, the node 308 may engage in both WLAN and BT transmissions.

In accordance with various embodiments, AP 302 may determine that node 308 is operating in a coexistence mode. More specifically, and as discussed above, node 308 may communicate with AP 302 using PSPoll and CTS2Self frames. In an illustrative embodiment, node 308 operates in WLAN mode and sends a PSPoll frame to AP 302 and during the same WLAN mode time period sends a CTS2Self frame to AP 302. No frames follow the CTS2Self frame. FIG. 2, element 210 shows such a WLAN mode time period. Such a sequence may cause AP 302 to determine that node 308 is operating in a coexistence mode. In an alternative embodiment, AP 302 may send a data frame to node 308 and expect a reply or acknowledgement. If AP 302 sends the data frame while node 308 is operating in BT mode, then node 308 will not reply or acknowledge the data frame. Additionally, AP 302 may send the data frame while node 308 is operating in WLAN mode; however, node 308 may not have enough time to send a reply or acknowledgement before switching to BT mode. Thus, failing to receive a reply or acknowledgement from node 308 after sending a data frame may also cause AP 302 to determine that node 308 is operating in a coexistence mode.

Again referring to FIG. 2, in some embodiments, the CTS2Self frame 206 is transmitted during WLAN mode 210 and indicates a duration of WLAN silence 211, which includes the BT mode 212. Thus, the CTS2Self frame 206 indicates when the upcoming BT mode 212 stops (time 213), thereby indicating when node 308 switches back to WLAN mode 214. However, the CTS2Self frame may not indicate when node 308 switches to the upcoming BT mode (time 215). AP 302 may predict when the node 308 will switch to the upcoming BT mode (time 215) by utilizing the duration of WLAN silence 211 in combination with knowledge of the duration of BT mode 212. For example, if node 308 operates in a coexistence mode to facilitate BT voice traffic during BT mode, BT voice traffic may occupy a 1.25 ms frame during each period. In this example, AP 302 may be aware that node 308 commonly uses BT modes 212, 216 to facilitate BT voice traffic, and thus deduct 1.25 ms from the endpoint of the duration of WLAN silence (time 213) to predict when node 308 will switch to the upcoming BT mode (time 215). Additionally, because BT voice traffic is periodic in nature, AP 302 may leverage the knowledge of the upcoming BT mode 212 to estimate when BT modes in future periods 216 will occur. This prediction mechanism may be extended to any traffic that is periodic in nature and it should be appreciated that certain other traffic may have a duration of more or less than 1.25 ms.

Referring back to FIG. 3, when the BT mode duration has been predicted by AP 302, AP 302 may send an acknowledgement to node 308 that AP 302 recognizes node 308 to be operating in a coexistence mode and that AP 302 has knowledge of when node 308 will be operating in WLAN mode and BT mode. Thus, AP 302 will only transmit data to node 308 during WLAN mode, which avoids the avalanche effect, and node 308 may cease to transmit PSPoll and CTS2Self frames. Thus, once AP 302 determines that node 308 is operating in a coexistence mode, the periodic nature of the coexistence mode allows AP 302 and node 308 to communicate without solicitation (i.e., without use of PSPoll and/or CTS2Self frames).

Figure 4:
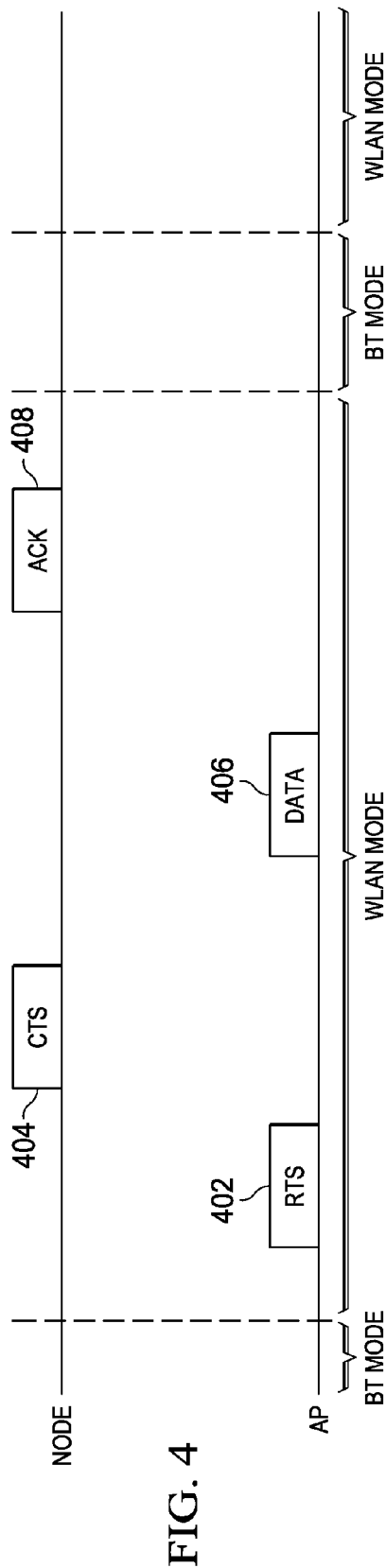
FIG. 4 shows the transmission of Request to Send/Clear to Send (RTS/CTS) messages in accordance with various embodiments.

In accordance with various embodiments, AP 302 may acknowledge that node 308 is operating in a coexistence mode by sending a Request to Send (RTS) message to node 308, prior to sending a data frame to node 308. Node 308 may acknowledge receipt of the RTS by sending a Clear to Send (CTS) message. Node 308 may also cease to transmit PSPoll and CTS2Self frames; thus, communication between AP 302 and node 308 occurs unsolicited. FIG. 4 shows the transmission of an RTS 402 by the AP 302 and a CTS 404 by node 308. Additionally, a data frame 406 is sent by AP 302 and an acknowledgement 408 is sent by node 308. If node 308 receives an RTS 402 from AP 302, node 308 may interpret the RTS 402 as signifying that AP 302 is aware that node 308 is operating in a coexistence mode. In other words, the receipt by node 308 of an RTS 402 from AP 302 serves as an acknowledgement that node 308 is operating in a coexistence mode.

Typically, AP 302 will transmit the RTS 402 such that there is sufficient time before node 308 switches to BT mode for node 308 to send a CTS 404 and for AP 302 to transmit a data frame 406 and receive an ACK 408 from node 308. However, conditions such as non-periodic traffic may cause the BT mode to be longer or shorter in duration than AP 302 predicted, and thus the prediction of when node 308 will switch to BT mode may be flawed. In such a situation, node 308, upon receiving the RTS 402, may determine that there is insufficient time remaining before switching to BT mode to send a CTS to AP 302, receive data from AP 302 and send an ACK to AP 302, and thus will resume sending PSPoll and CTS2Self frames to AP 302. AP 302 may observe these frames from node 308 and, as above, predict when BT modes will occur.

In alternative embodiments, a BT mode mis-prediction by AP 302 may be handled differently. For example, if AP 302 has already acknowledged node 308 in a coexistence mode through the RTS-CTS mechanism described above, and AP 302 predicts that node 308 should be in WLAN mode, but node 308 is in BT mode because of non-periodic BT traffic, AP 302 is unaware that node 308 is in BT mode and attempts to transmit data to node 308, where the transmission of data is not preceded by the RTS-CTS mechanism. Node 308 will not respond immediately, since node 308 is operating in BT mode. As discussed above, node 308 failing to respond to a data frame transmission will cause AP 302 to trigger a rate-fall back mechanism. Upon determining that the transmission rate has been reduced, node 308 may determine that there has been a BT mode mis-prediction and resume sending PSPoll and CTS2Self frames. AP 302 may observe these frames from node 308 and, as above, predict when BT modes will occur.

Figure 5:
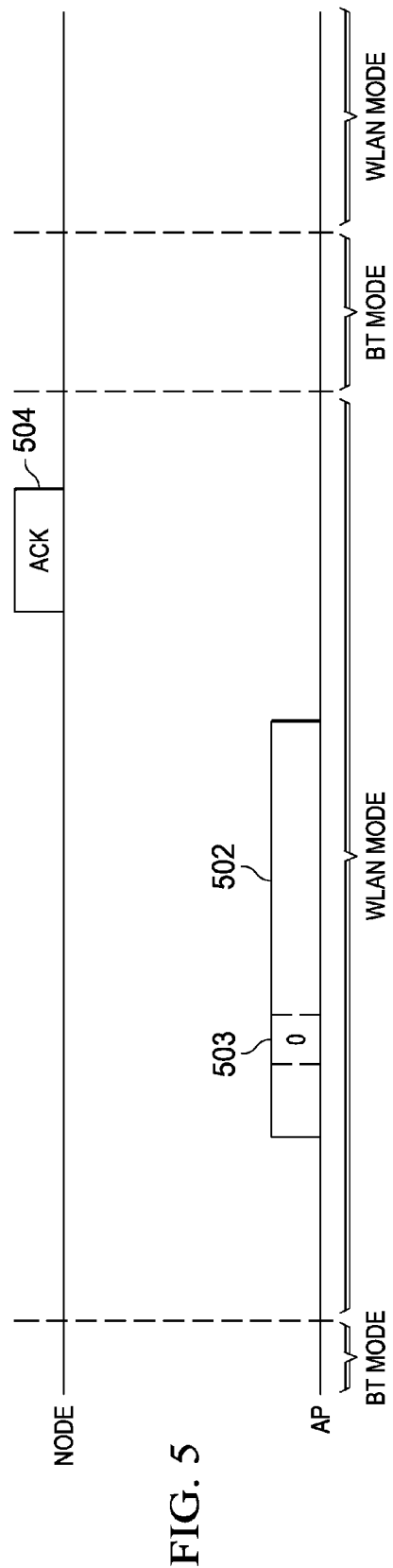
FIG. 5 shows the transmission of a data frame in accordance with various embodiments.

In some embodiments, AP 302 may facilitate unsolicited communications by sending data frames with a "more-data" bit set to zero. Setting the more-data bit to zero causes node 308 not to transmit a PSPoll frame, which would normally be used to inform AP 302 that node 308 is ready to receive more data. FIG. 5 shows AP 302 sending a data frame 502 with the "more data" bit 503 set to zero. Thus, AP 302 may also indicate a BT mode mis-prediction by setting the more-data bit 503 to one, since this will cause node 308 to transmit PSPoll and CTS2Self frames. For example, if AP 302 sends a data frame 502 with the more-data bit 503 set to zero, AP 302 expects to receive an ACK 504 from node 308. If no ACK 504 is received, AP 302 determines that a BT mode mis-prediction has occurred and sends a data frame 502 with the more-data bit 503 set to one, indicating the BT mode mis-prediction to node 308 and triggering the transmission by node 308 of PSPoll and CTS2Self frames. AP 302 may observe these frames from node 308 and, as above, predict when BT modes will occur.

In accordance with various embodiments, AP 302 may detect when node 308 stops using BT mode. In this situation, the AP 302 may stop communicating with node 308 as if it is operating in a coexistence mode. AP 302 may treat the reception of a WLAN transmission from node 308 during the predicted BT mode as an indication of the termination of BT traffic at node 308. Alternatively, AP 302 may transmit an RTS to node 308 before the predicted BT mode, so that node 308 may only send a CTS when BT mode is not under use anymore. If a CTS is received early (i.e., during what would normally be the BT mode), AP 302 may deduce that node 308 is no longer operating in a coexistence mode. AP 302 may also send a data frame that overlaps with the BT mode to observe if the BT traffic at node 308 is still active. Reception of an ACK from node 308 indicates that BT traffic is not active and data may be transmitted to node 308 at any time. Thus, AP 302 realizes when node 308 no longer operates in a coexistence mode, and may take advantage of the BT mode time every period to communicate with the node 308. This positively impacts the bandwidth availability between node 308 and AP 302.

In accordance with various embodiments, functionality of AP 302 and node 308 may be combined in a single device. One skilled in the art would understand that such combination could facilitate creation of ad hoc networks where nodes may assume the role of APs in relation to other nodes in the network. In this way, node 308 may function as a "soft AP" for node 318, for example.

Figure 6:
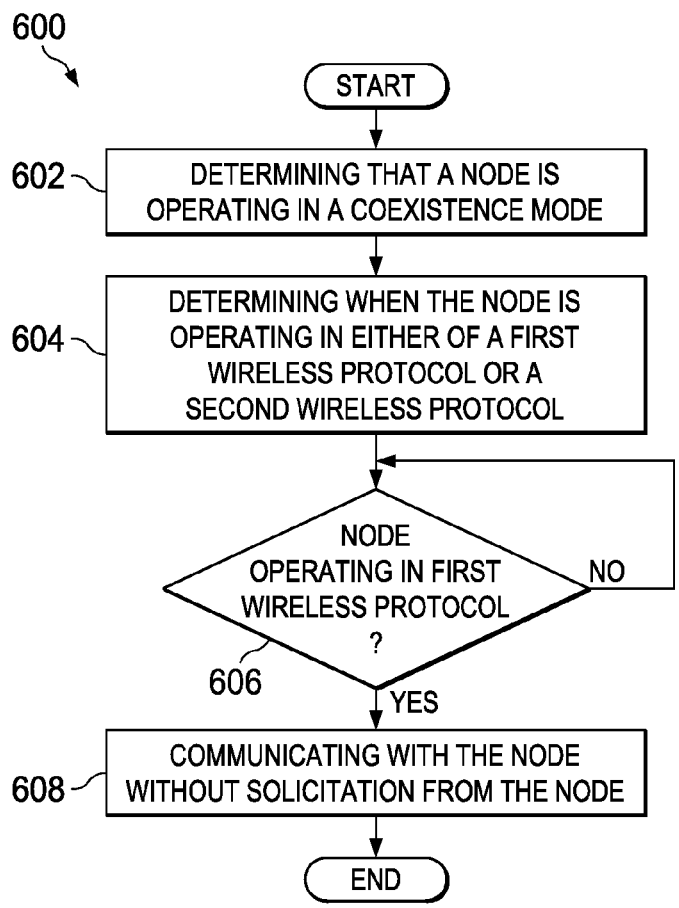
FIG. 6 shows a flow diagram of an illustrative method in accordance with various embodiments.

FIG. 6 shows a method 600 in accordance with various embodiments. The method begins when an AP 302 determines that a node 308 is operating in a coexistence mode (block 602). As above, node 308 operates in WLAN mode and sends a PSPoll frame to AP 302 and during the same WLAN mode time period sends a CTS2Self frame to AP 302. No frames follow the CTS2Self frame. FIG. 2, element 210 shows such a WLAN mode time period. Such a sequence may cause AP 302 to determine that node 308 is operating in a coexistence mode. In an alternative embodiment, AP 302 may send a data frame to node 308 and expect a reply or acknowledgement. If AP 302 sends the data frame while node 308 is operating in BT mode, then node 308 will not reply or acknowledge the data frame. Additionally, AP 302 may send the data frame while node 308 is operating in WLAN mode; however, node 308 may not have enough time to send a reply or acknowledgement before switching to BT mode. Thus, failing to receive a reply or acknowledgement from node 308 after sending a data frame may also cause AP 302 to determine that node 308 is operating in a coexistence mode.

The method then proceeds to the AP 302 determining when the node 308 is operating in a first wireless protocol (e.g. WLAN) and a second wireless protocol (e.g., BT) (block 604). Referring back to FIGS. 2 and 3 as an example, if node 308 operates in a coexistence mode to facilitate BT voice traffic during BT mode, BT voice traffic may occupy a 1.25 ms frame during each period. In this example, AP 302 may be aware that node 308 commonly uses BT modes 212, 216 to facilitate BT voice traffic, and thus deduct 1.25 ms from the endpoint of the duration of WLAN silence (time 213) to predict when node 308 will switch to the upcoming BT mode (time 215). Additionally, because BT voice traffic is periodic in nature, AP 302 may leverage the knowledge of the upcoming BT mode 212 to estimate when BT modes in future periods 216 will occur. This prediction mechanism may be extended to any traffic that is periodic in nature and it should be appreciated that certain other traffic may have a duration of more or less than 1.25 ms.

If the node 308 is operating in the first wireless protocol (decision block 606), the method proceeds to the AP 302 communicating with the node 308 without solicitation from the node (block 608) (i.e., without PSPoll frame, CTS2Self frame or both) and the method ends. Such unsolicited communication may employ the RTS-CTS mechanism as in FIG. 4 and described above, or setting the "more data" bit 503 to zero as in FIG. 5 and described above. However, if the node 308 is not operating in WLAN mode (decision block 606), the method waits until the node 308 is operating in the first wireless protocol.

Figure 7:
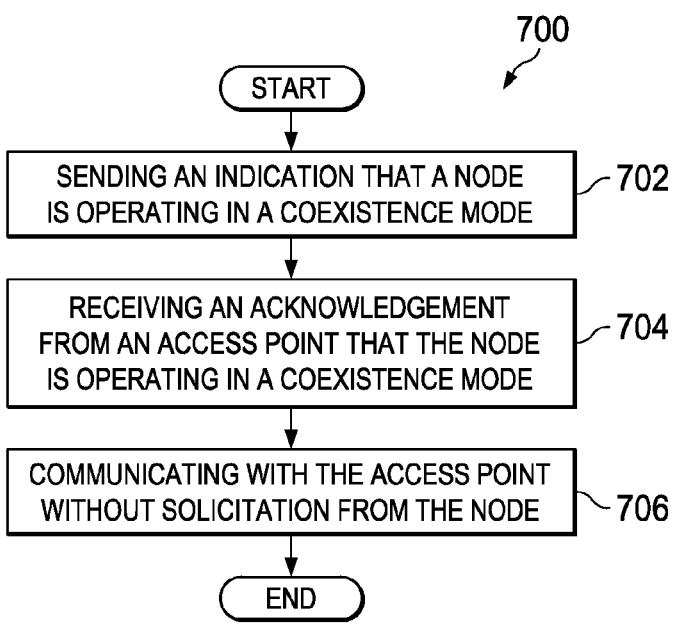
FIG. 7 shows a flow diagram of another illustrative method in accordance with various embodiments.

FIG. 7 shows a method 700 in accordance with various embodiments. The method begins when a node 308 sends an indication that it is operating in a coexistence mode (block 702). As above, node 308 operates in WLAN mode and sends a PSPoll frame and during the same WLAN mode time period sends a CTS2Self frame. No frames follow the CTS2Self frame. FIG. 2, element 210 shows such a WLAN mode time period. Such a sequence may indicate that node 308 is operating in a coexistence mode. The method then proceeds to the node receiving an acknowledgement from an AP 302 that the node 308 is operating in a coexistence mode (block 704). In some embodiments, the node 308 receiving an RTS message from AP 302 serves as an acknowledgement of node 308 operating in a coexistence mode, as in FIG. 4 and described above. The method continues with the node 308 communicating with the AP 302 without solicitation from the node 308 (block 706) and the method ends. Such unsolicited communication may employ the RTS-CTS mechanism as in FIG. 4 and described above, or setting the "more data" bit 503 to zero as in FIG. 5 and described above.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system comprising:
   a device configured to communicate, using a first wireless protocol, with a node; and
   a processor coupled to the device and configured to determine whether the node operates in a coexistence mode;
      wherein, if the processor determines that the node operates in a coexistence mode then, as a result, the processor:
         determines when the node operates in the first wireless protocol; and
         communicates, by way of the device and without solicitation from the node, with the node when the node operates in the first wireless protocol, if the processor receives an indication that the processor has incorrectly determined when the node operates in the first wireless protocol then, as a result, the processor communicates, by the way of the device, with the node in response to solicitation from the node.

2. The system of claim 1 wherein if the processor determines that the node operates in a coexistence mode then, as a result, the processor further determines that the node periodically operates in at least the first wireless protocol and a second wireless protocol.

3. The system of claim 2 wherein if the processor determines that the node operates in a coexistence mode then, as a result, the processor further receives an indication of when the node ceases to operate in the second wireless protocol.

4. The system of claim 2 wherein if the processor determines that the node operates in a coexistence mode then, as a result, the processor further determines when the node begins to operate in the second wireless protocol.

5. The system of claim 1 wherein if the processor determines that the node operates in a coexistence mode then, as a result, the processor further communicates with the node only when the node operates in the first wireless protocol.

6. A system comprising:
a device configured to communicate, using a first wireless protocol, with a node; and
a processor coupled to the device and configured to determine whether the node operates in a coexistence mode, wherein if the processor receives an indication that the node is available for a data transmission and the processor subsequently receives a request for network silence, then, as a result, the processor determines that the node is operating in a coexistence mode;
if the processor determines that the node operates in a coexistence mode then, as a result, the processor:
determines when the node operates in the first wireless protocol; and
communicates, by the way of the device and without solicitation from the node, with the node when the node operates in the first wireless protocol.

7. A method comprising:
determining, by an access point, that a node is operating in a coexistence mode;
determining, by the access point, when the node is operating in either of a first wireless protocol or a second wireless protocol;
communicating, by the access point and without solicitation from the node, with the node only when the node is operating in the first wireless protocol; and
receiving, by the access point, an indication that the access point has incorrectly determined when the node is operating in the first wireless protocol and second wireless protocol and, as a result, communicating with the node using solicitation from the node.

8. The method of claim 7 wherein determining when the node is operating in each of a first wireless protocol and a second wireless protocol further comprises determining that the node is periodically operating in at least the first wireless protocol and a second wireless protocol.

9. The method of claim 8 further comprising receiving an indication of when the node ceases to operate in the second wireless protocol.

10. The method of claim 8 further comprising determining when the node begins to operate in the second wireless protocol.

11. A method comprising:
determining, by an access point, that a node is operating in a coexistence mode comprising:
receiving an indication that the node is available for a data transmission followed by;
receiving a request for network silence;
determining, by the access point, when the node is operating in either of a first wireless protocol or a second wireless protocol;
communicating, by the access point and without solicitation from the node, with the node only when the node is operating in the fist wireless protocol.

* * * * *